(12) United States Patent
Li et al.

(10) Patent No.: US 8,364,838 B2
(45) Date of Patent: Jan. 29, 2013

(54) METHOD FOR PLAYING STREAMING DATA, ELECTRONIC DEVICE FOR PERFORMING THE SAME AND INFORMATION STORAGE MEDIA FOR STORING THE SAME

(75) Inventors: Kuan-Hui Li, Taoyuan (TW); Yung-Hsing Wang, Taoyuan (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 535 days.

(21) Appl. No.: 12/241,402

(22) Filed: Sep. 30, 2008

(65) Prior Publication Data
US 2009/0292820 A1     Nov. 26, 2009

(30) Foreign Application Priority Data

May 20, 2008   (TW) ................................ 97118492 A

(51) Int. Cl.
*G06F 15/16*   (2006.01)
(52) U.S. Cl. ......... 709/231; 709/203; 709/219; 709/233
(58) Field of Classification Search .................. 709/203, 709/219, 231, 233
See application file for complete search history.

(56) References Cited

U.S. PATENT DOCUMENTS

| | | | | | |
|---|---|---|---|---|---|
| 5,629,732 | A | * | 5/1997 | Moskowitz et al. | 725/102 |
| 6,012,109 | A | * | 1/2000 | Schultz | 710/56 |
| 6,061,749 | A | * | 5/2000 | Webb et al. | 710/65 |
| 2002/0169926 | A1 | | 11/2002 | Pinckney, III et al. | |
| 2003/0221194 | A1 | | 11/2003 | Thiagarajan et al. | |
| 2006/0146660 | A1 | * | 7/2006 | Ikeda et al. | 369/30.13 |
| 2006/0235883 | A1 | * | 10/2006 | Krebs | 707/104.1 |
| 2007/0035632 | A1 | * | 2/2007 | Silvernail et al. | 348/211.3 |
| 2008/0133766 | A1 | * | 6/2008 | Luo | 709/231 |
| 2008/0134258 | A1 | * | 6/2008 | Goose et al. | 725/91 |
| 2009/0055005 | A1 | * | 2/2009 | Oxman et al. | 700/94 |
| 2010/0146138 | A1 | * | 6/2010 | Ng et al. | 709/231 |

FOREIGN PATENT DOCUMENTS

| | | |
|---|---|---|
| CN | 101127989 | 2/2008 |
| WO | 0060500 | 10/2000 |
| WO | 0180558 | 10/2001 |
| WO | 2004057865 | 7/2004 |
| WO | WO 2009/033345 | 3/2009 |

OTHER PUBLICATIONS

European Office Action dated Nov. 7, 2011.
Chinese language office action dated Aug. 25, 2011.
English language translation of abstract of CN 101127989 (published Feb. 20, 2008).
English language translation of abstract of WO 2009/033345 (published Mar. 19, 2009).

* cited by examiner

*Primary Examiner* — Phuoc Nguyen
(74) *Attorney, Agent, or Firm* — McClure, Qualey & Rodack, LLP

(57) ABSTRACT

A method for playing streaming data is suitable for an electronic device having a limited memory resource. The method includes: downloading a part of a streaming file to a buffer memory for playing, a size of the streaming file being larger than a capacity of the buffer memory; downloading another part of the streaming file to the buffer memory; and overwriting a played part of the streaming file stored in the buffer memory based on a usage status of the buffer memory.

36 Claims, 6 Drawing Sheets

METHOD FOR PLAYING STREAMING DATA, ELECTRONIC DEVICE FOR PERFORMING THE SAME AND INFORMATION STORAGE MEDIA FOR STORING THE SAME

This application claims the benefit of Taiwan application Serial No. 97118492, filed May 20, 2008 the subject matter of which is incorporated herein by reference.

BACKGROUND OF THE INVENTION

1. Field of the Invention

The invention relates in general to a method for playing streaming data, an electronic device and an information storage media for storing a method for playing the streaming data, and more particularly to a method for playing streaming data in a client having a limited memory resource, an electronic device capable of playing the streaming data without being restricted by the memory resource, and an information storage media for storing the method for playing the streaming data.

2. Description of the Related Art

In the modern life, downloading multimedia data from web sites for watching or listening has become one part of the leisure life. At present, several streaming techniques have been developed so that the user can play the multimedia streaming data stored in the network server.

Two main streaming techniques include a progressively download technique and a real-time streaming technique. The progressively download technique is to download a part of the multimedia streaming data from the network so that the user can play the downloaded part at first, and then the other part of the multimedia streaming data can be sequentially downloaded. In the progressively download technique, when the multimedia streaming data has been completely played, the multimedia streaming data has been completely downloaded to the client so that the user can play the data again in the future. The difference between the real-time streaming technique and the progressively download technique is that the client only can play the multimedia streaming data but cannot store the multimedia streaming data in the client.

When the progressively download technique is utilized to play the multimedia streaming data, a buffer memory has to be configured/programmed in the client to temporarily store the multimedia streaming data. The capacity of the buffer memory has to be larger than or equal to the size of the multimedia streaming data. When the size of the multimedia streaming data is getting larger and larger, the capacity of the buffer memory has to be increased therewith.

If the client has the sufficient available memory resource, for example, if the client is a personal computer or a notebook computer, there is no big problem in the memory resource allocation even if a large buffer memory is needed and configured for the playing of the multimedia streaming data.

Nevertheless, if the client does not has the sufficient available memory resource, for example, if the client is a mobile telephone or a personal digital assistant (PDA) with a connection function, the memory resource allocation in the client may have troubles or even the multimedia streaming data cannot be smoothly played when the large-size multimedia streaming data is to be played.

SUMMARY OF THE INVENTION

The invention is directed to a method for playing multimedia streaming data, wherein the method is suitable for an electronic device having a limited memory resource and can effectively play the multimedia streaming data using the limited memory resource in conjunction with the progressively download technique.

The invention is directed to an electronic device with a limited memory resource, wherein the electronic device can effectively utilize the limited memory resource when the progressively download technique is adopted to play the multimedia streaming data.

The invention is directed to an information storage media for storing a program, which may be used to perform a method for playing multimedia streaming data, wherein the method is suitable for an electronic device with a limited memory resource.

According to a first aspect of the present invention, a method for playing streaming data is provided. The method is suitable for an electronic device having a buffer memory. The method includes: downloading a part of a streaming file to the buffer memory for playing, wherein a size of the streaming file is larger than a capacity of the buffer memory; downloading another part of the streaming file to the buffer memory; and overwriting a played part of the streaming file stored in the buffer memory based on a usage status of the buffer memory.

According to a second aspect of the present invention, a method for playing streaming data is provided. The method is suitable for an electronic device having a buffer memory. The method includes: progressively downloading a streaming file to the buffer memory, wherein a size of the streaming file is larger than a capacity of the buffer memory; playing and temporarily storing the streaming file stored in the buffer memory; and determining whether or not to overwrite a part of the streaming file stored in the buffer memory based on a data writing position of the buffer memory.

According to a third aspect of the present invention, an electronic device is provided. The electronic device includes a buffer memory, a download unit and a processing module. The processing module is coupled to the buffer memory and the download unit and for controlling operations of the buffer memory and the download unit. The download unit downloads a part of a streaming file to the buffer memory for playing, and a size of the streaming file is larger than a capacity of the buffer memory. The download unit downloads another part of the streaming file to the buffer memory. When the buffer memory has been fully filled, the processing module overwrites a played part of the streaming file stored in the buffer memory.

According to a fourth aspect of the present invention, an electronic device is provided. The electronic device includes a buffer memory, a download unit and a processing module. The processing module is coupled to the buffer memory and the download unit and is for controlling operations of the buffer memory and the download unit. The download unit progressively downloads a streaming file to the buffer memory, and a size of the streaming file is larger than a capacity of the buffer memory. The processing module plays and temporarily stores the streaming file stored in the buffer memory. The processing module determines whether or not to overwrite a part of the streaming file stored in the buffer memory based on a data writing position of the buffer memory.

According to a fifth aspect of the present invention, a computer readable information storage media, on which a program is stored, is provided. The program is used to perform a method for playing streaming data. The method for playing the streaming data is suitable for an electronic device having a buffer memory. The method includes: downloading a part of a streaming file to the buffer memory for playing, wherein a size of the streaming file is larger than a capacity of the buffer memory; downloading another part of the streaming file to the buffer memory; and overwriting a played part of the streaming file stored in the buffer memory when the buffer memory has been fully filled.

According to a sixth aspect of the present invention, a computer readable information storage media, on which a program is stored, is provided. The program is used to perform a method for playing streaming data. The method for playing the streaming data is suitable for an electronic device having a buffer memory. The method includes: progressively downloading a streaming file to the buffer memory, wherein a size of the streaming file is larger than a capacity of the buffer memory; playing and temporarily storing the streaming file stored in the buffer memory; and determining whether or not to overwrite a part of the streaming file stored in the buffer memory based on a data writing position of the buffer memory.

In summary, the invention has the following advantages. Even if the memory resource of the electronic device is limited, the invention still can download and play the multimedia streaming data of a large file so that the limited memory resource can be effectively utilized.

The invention will become apparent from the following detailed description of the preferred but non-limiting embodiments. The following description is made with reference to the accompanying drawings.

DETAILED DESCRIPTION OF THE INVENTION

In an embodiment of the invention, a buffer memory is configured in a client to store a downloaded multimedia streaming data in order to enable the client having limited memory resource to progressively download and play the multimedia streaming data. The usage concept of the buffer memory is similar to a ring buffer. That is, when an ending address of the buffer space has been used, then it is to seek available spaces from a starting address of the buffer space. Consequently, the capacity of the buffer memory may be smaller than the size of the to-be-downloaded multimedia streaming data, and the client still can effectively use the space of the buffer memory and overwrite the played multimedia streaming data. Thus, the multimedia streaming data can be completely played without being limited by the limited capacity of the buffer memory.

Figure 1A:
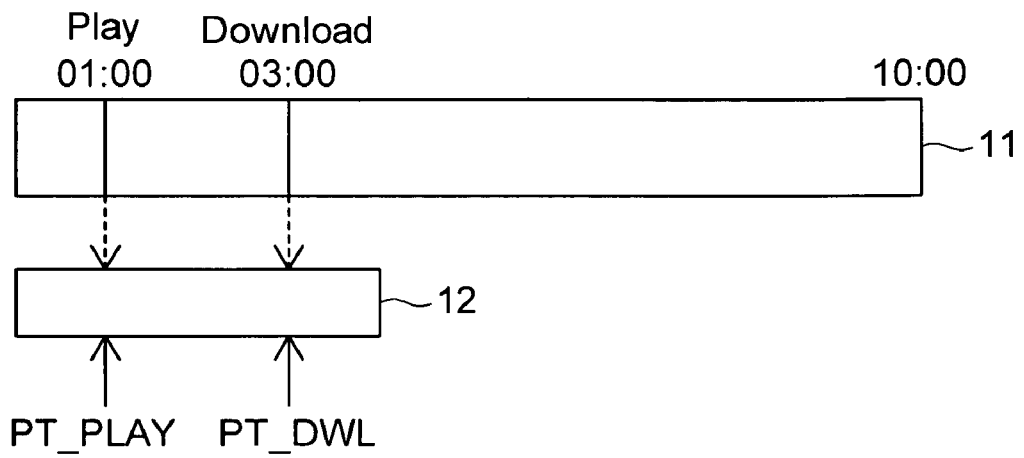
FIGS. 1A to 1C are schematic illustrations showing methods of playing multimedia streaming data according to an embodiment of the invention.
Figure 1B:
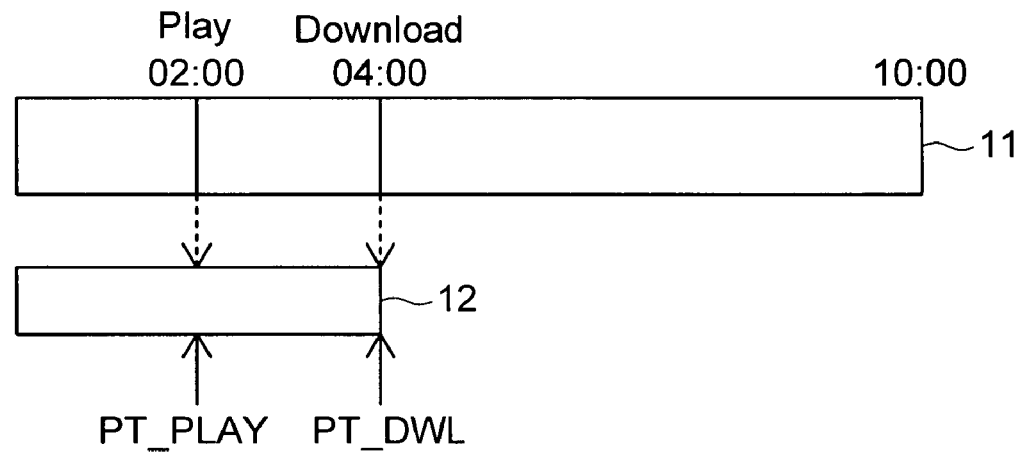
Figure 1C:
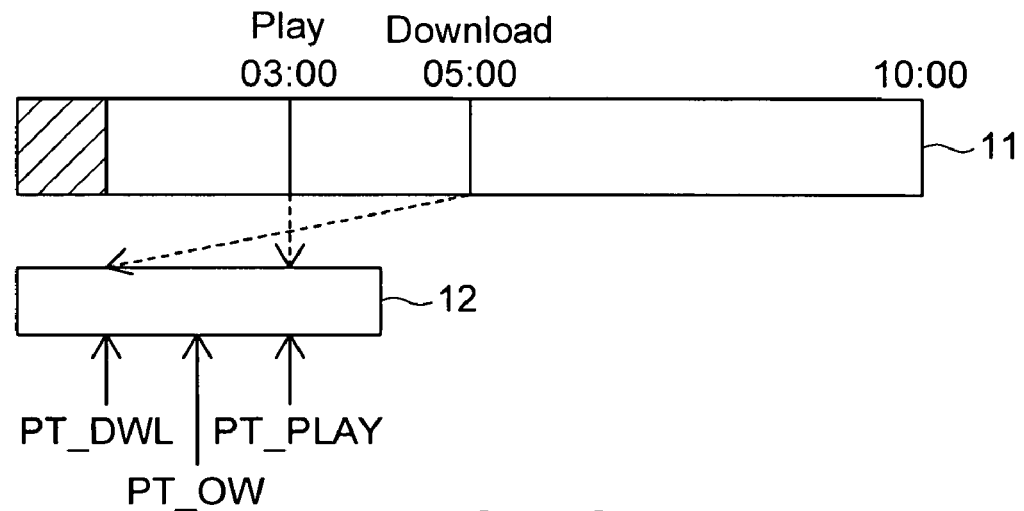

FIGS. 1A to 1C are schematic illustrations showing methods of playing multimedia streaming data according to an embodiment of the invention. As shown in FIGS. 1A to 1C, a play indicator PT_PLAY is directed to a reading position of the buffer memory, which corresponds to a playing position of the multimedia streaming data. A download indicator PT_DWL is directed to a writing position of the buffer memory, which corresponds to a download position of the multimedia streaming data. An overwriting indicator PT_OW is directed to an allowable overwriting position of the buffer memory, which corresponds to parts of the multimedia streaming data, which are stored in the buffer memory and may be overwritten.

FIG. 1A shows the status where the buffer memory is not yet fully filled, and the data stored in the buffer memory does not have to be overwritten. FIG. 1B shows the status where the buffer memory has been fully filled, and the played data/overwriteable data has to be overwritten. FIG. 1C shows the status where the required data is downloaded and the played data/overwriteable data is overwritten.

In this embodiment, the capacity of the buffer memory is determined based on the available memory resource and the current memory usage status of the client. For example, the capacity of the buffer memory may be larger when the available memory resource is larger; and the capacity of the buffer memory may be larger when the current memory is not so busy.

In this embodiment, when the buffer memory is fully filled, the overwriting indicator PT_OW is a meaningful indicator. The overwriting indicator PT_OW is determined based on an average download speed of the multimedia streaming data and the play indicator PT_PLAY.

For example, if the average download speed of the multimedia streaming data is high, the address to which the overwriting indicator PT_OW is directed substantially falls at the two-third portion of the memory block between the address, to which the play indicator PT_PLAY is directed, and the starting address of the buffer memory 12, and is closer to the play indicator PT_PLAY.

For example, if the average download speed of the multimedia streaming data is slow, the address to which the overwriting indicator PT_OW is directed substantially falls at the one-third portion of the memory block between the address, to which the play indicator PT_PLAY is directed, and the starting address of the buffer memory 12, and is farther from the play indicator PT_PLAY.

Of course, the relationship between the overwriting indicator PT_OW and the play indicator PT_PLAY is not limited thereto, and one of ordinary skill in the art may easily modify the relationship as long as the overwriting indicator PT_OW does not exceed the play indicator PT_PLAY and the client can normally play the multimedia streaming data.

When the overwriting indicator PT_OW is meaningful, the download indicator PT_DWL is restricted by the overwriting indicator PT_OW; and for example, the download indicator PT_DWL cannot exceed the overwriting indicator PT_OW. The overwriting indicator PT_OW is set in order to avoid error overwriting. When the download speed is high and the playing speed is low, some data that is not played may be error overwritten so that the play error/discontinuity is caused. Consequently, the overwriting indicator PT_OW is set in this embodiment to restrict the download indicator PT_DWL so that the error overwriting condition may be avoided.

In this embodiment, illustrations will be made by taking the process of downloading the multimedia streaming data for 10 minutes as an example, wherein the size of the multimedia streaming data is larger than the capacity of the buffer memory. In the following drawings, the dashed-line arrows between the multimedia streaming data 11 and the buffer memory 12 represent the read/write positions of the correspondingly parts of the multimedia streaming data 11 in the buffer memory 12. Taking FIG. 1A as the example, when the first minute of the multimedia streaming data 11 is being played, this part is stored in the corresponding position of the buffer memory 12, to which the play indicator PT_PLAY is directed, as indicated by the dashed-line arrow.

As shown in FIG. 1A, when the multimedia streaming data 11 is downloaded from the network, it is unnecessary to overwrite a part of the multimedia streaming data 11, which has been stored in the buffer memory 12, because the buffer memory 12 is not yet fully filled. In FIG. 1A, "01:00" associated with the play indicator PT_PLAY represents that the first minute of the multimedia streaming data 11 has been played, and "03:00" associated with the download indicator PT_DWL represents that the third minute of the multimedia streaming data 11 has been downloaded.

As shown in FIG. 1B, the download indicator PT_DWL has reached the top address of the buffer memory 12, which means that the buffer memory 12 has been fully filled, because the multimedia streaming data 11 is continuously downloaded. So, some parts of the multimedia streaming data 11 stored in the buffer memory 12 have to be sequentially overwritten.

As shown in FIG. 1C, the multimedia streaming data 11 is continuously downloaded, and the subsequently downloaded data overwrites some parts of the multimedia streaming data 11, which have been stored in the buffer memory 12. In FIG. 1C, when the fifth minute of the multimedia streaming data 11 has been downloaded, some played parts of the multimedia streaming data 11 (zeroth to first minutes) are overwritten by the subsequently downloaded parts of the multimedia streaming data 11 (fourth to fifth minutes).

The user may sometimes seek backward to again play the played parts. FIGS. 2A, 2B, and 3A to 3C show backward seeking conditions during playing according to the embodiment of the invention.

Figure 2A:
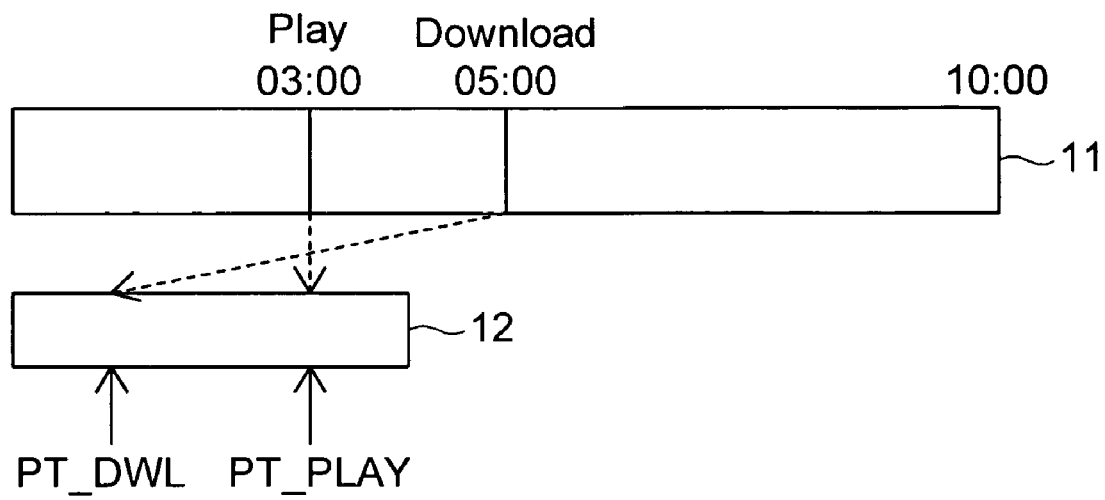
FIGS. 2A, 2B, and 3A to 3C show backward seeking conditions during playing according to the embodiment of the invention.
Figure 2B:
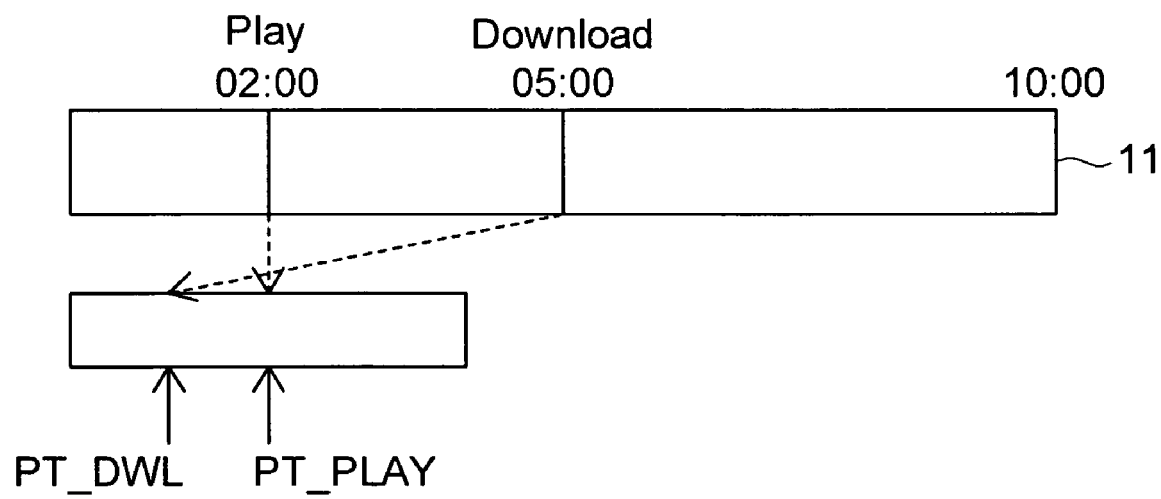

As shown in FIG. 2A, it is assumed that the user is watching the third minute of the multimedia streaming data 11. Next, the user seeks backward to again play the second minute of the multimedia streaming data 11. Because the part (second minute) to be played by the user has not yet been overwritten, the user can play the second minute of the multimedia streaming data 11 without waiting or downloading the new data. In addition, the play indicator PT_PLAY is directed to the position of the memory for storing the second minute of the multimedia streaming data 11, as shown in FIG. 2B.

Figure 3A:
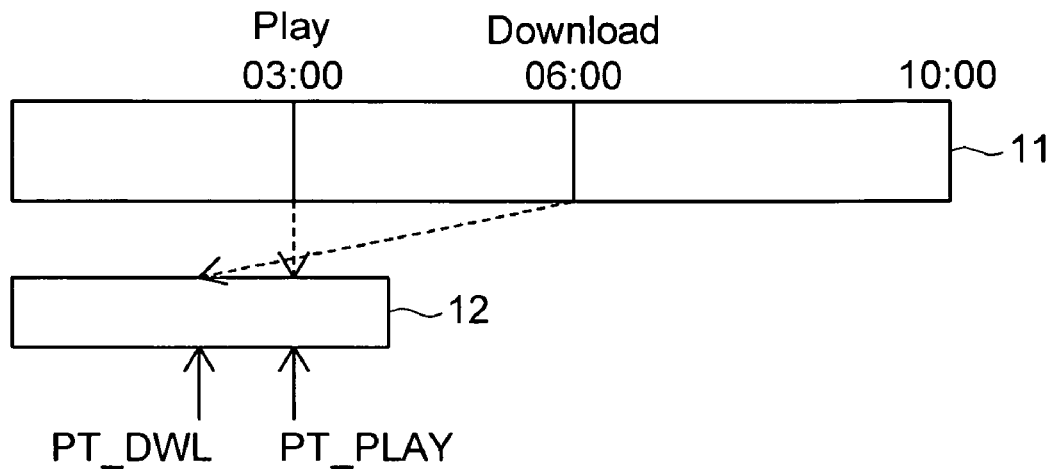
Figure 3B:
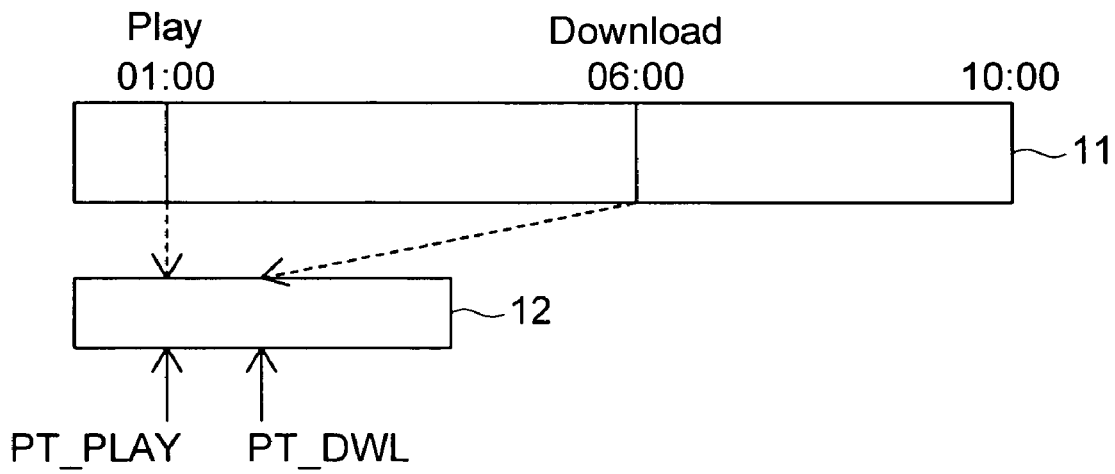
Figure 3C:
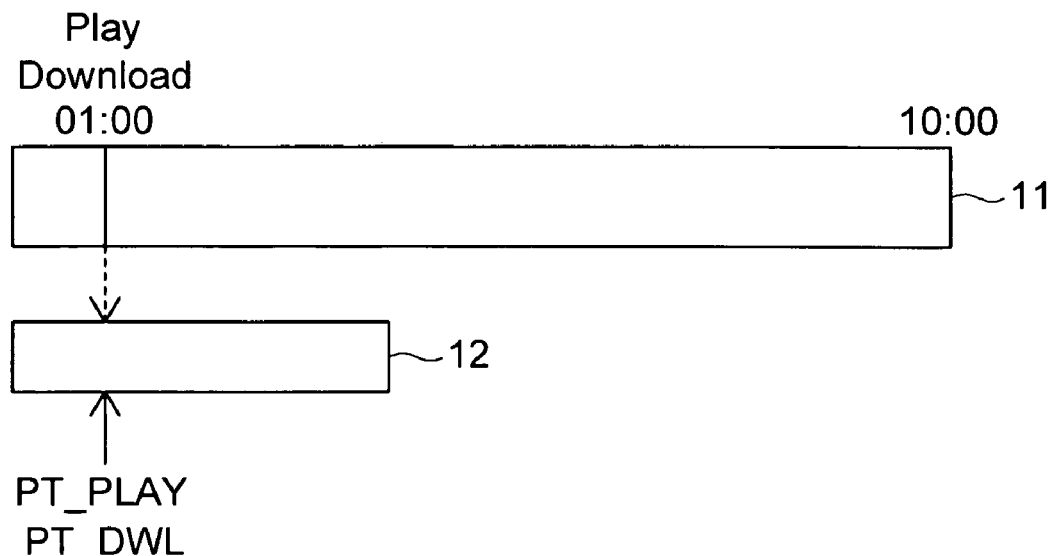

Oppositely, during the backward seeking, if the part to be played by the user has been overwritten, the part to be played by the user has to be downloaded again. As shown in FIG. 3A, it is assumed that the user is watching the third minute of the multimedia streaming data 11, and the sixth minute of the multimedia streaming data 11 has been downloaded. The user seeks backward to play the first minute of the multimedia streaming data 11 again, but the part (first minutes) to be played by the user has been overwritten, as shown in FIG. 3B. So, the sought to-be-played part has to be downloaded again, and the play indicator PT_PLAY and the download indicator PT_DWL have to be directed to the new positions, as shown in FIG. 3C.

The user may sometimes seek forward. FIGS. 4A, 4B and 5A to 5C show forward seeking conditions during playing according to the embodiment of the invention.

Figure 4A:
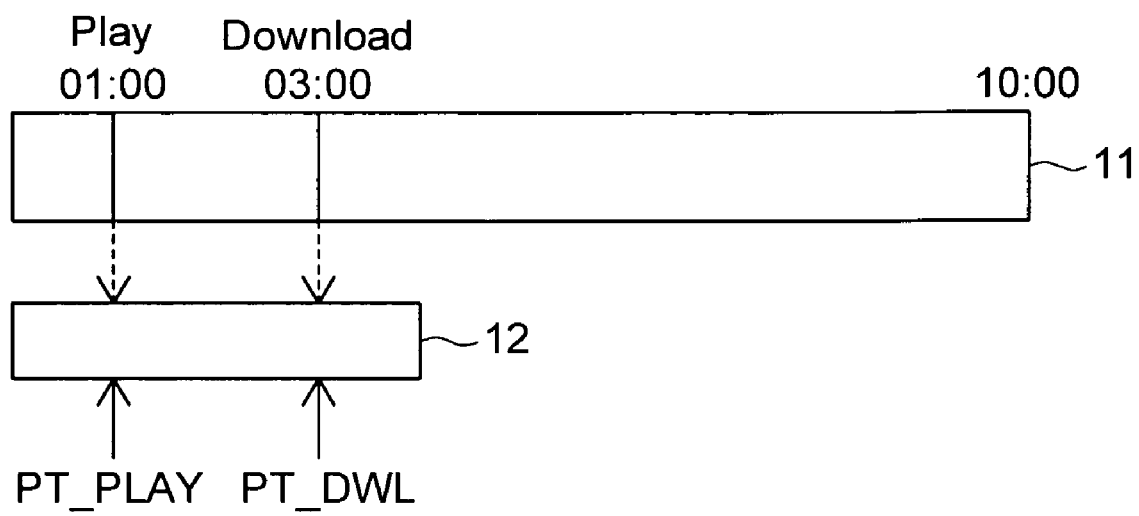
FIGS. 4A, 4B and 5A to 5C show forward seeking conditions during playing according to the embodiment of the invention.
Figure 4B:
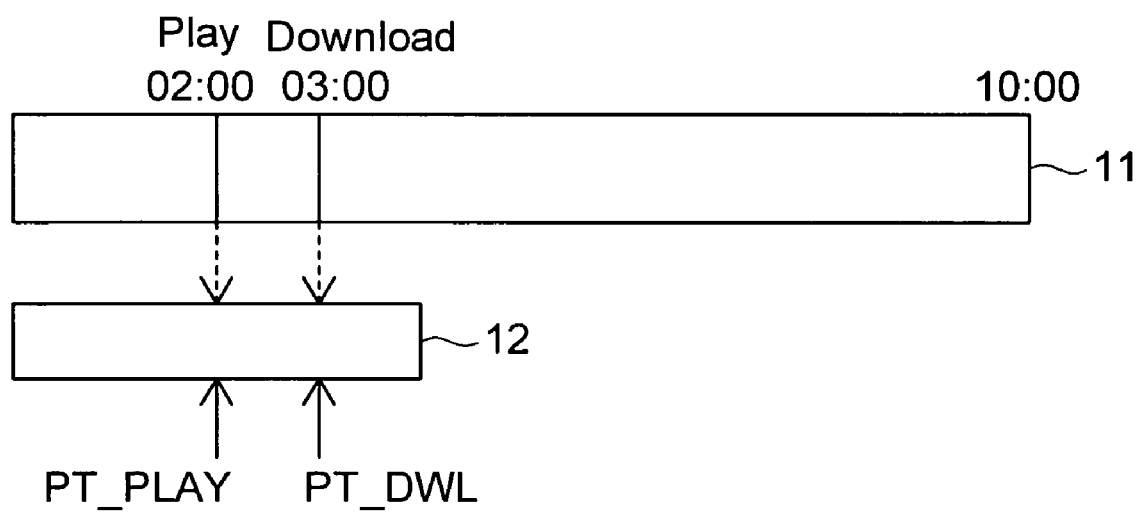

As shown in FIG. 4A, it is assumed that the user is watching the first minute of the multimedia streaming data 11. As shown in FIG. 4B, the user seeks forward to play the second minute of the multimedia streaming data 11. Because the part (second minute) to be played by the user has been downloaded to the buffer memory 12, the user can play the second minute of the multimedia streaming data 11. At this time, the play indicator PT_PLAY is directed to the new position, as shown in FIG. 4B.

Figure 5A:
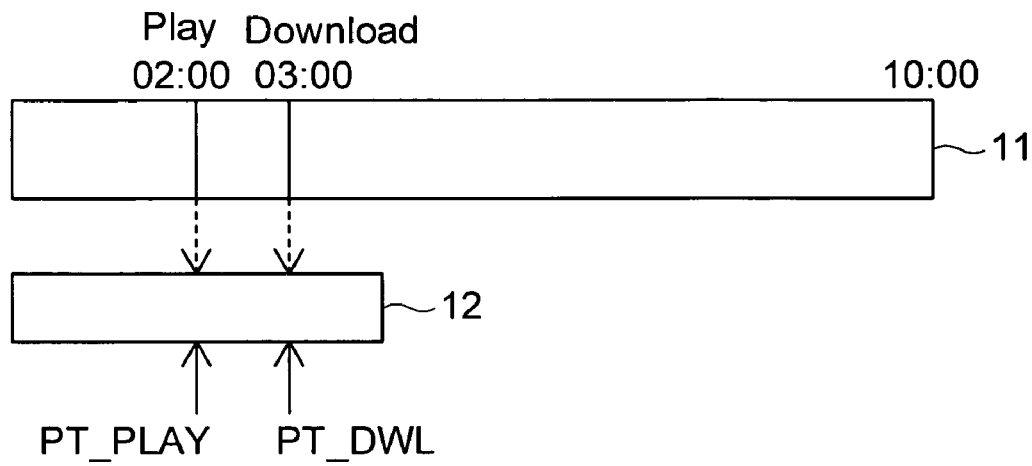
Figure 5B:
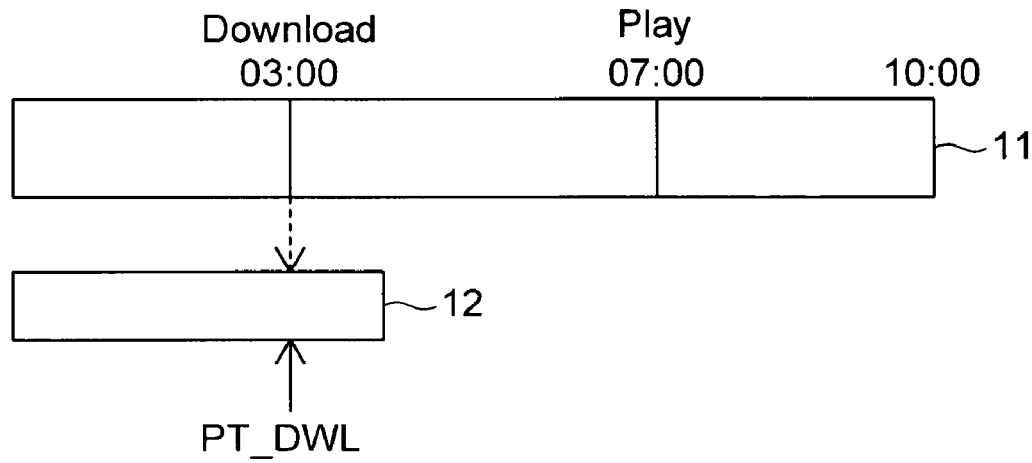
Figure 5C:
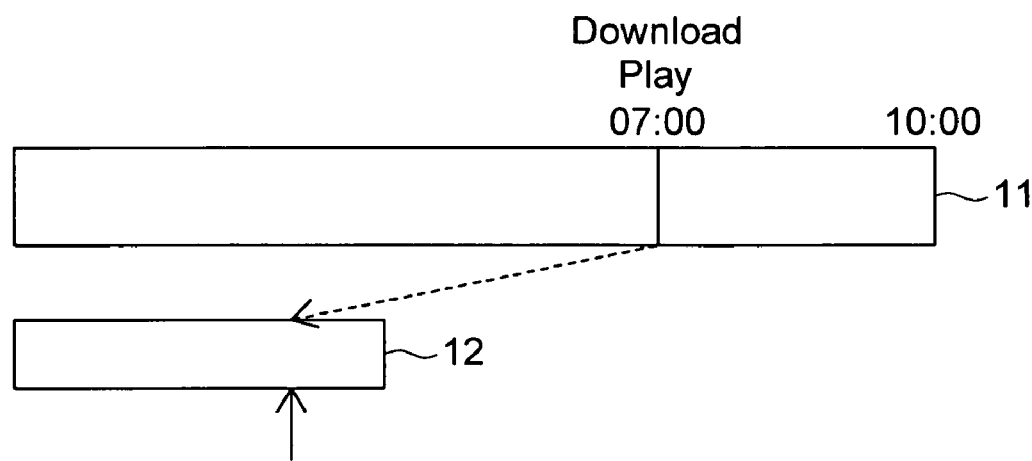

Oppositely, if the part to be played by the user has not yet been stored in the buffer memory 12 during the forward seeking, the part to be played by the user has to be downloaded. As shown in FIG. 5A, it is assumed that the user is watching the second minute of the multimedia streaming data 11. Next, the user seeks forward to play the seventh minute of the multimedia streaming data 11, but the part (seventh minutes) to be played by the user has not yet been stored in the buffer memory 12, as shown in FIG. 5B. So, the sought to-be-played part has to be downloaded from the network, and the play indicator PT_PLAY and the download indicator PT_DWL have to be directed to the new positions, as shown in FIG. 5C.

Figure 6:
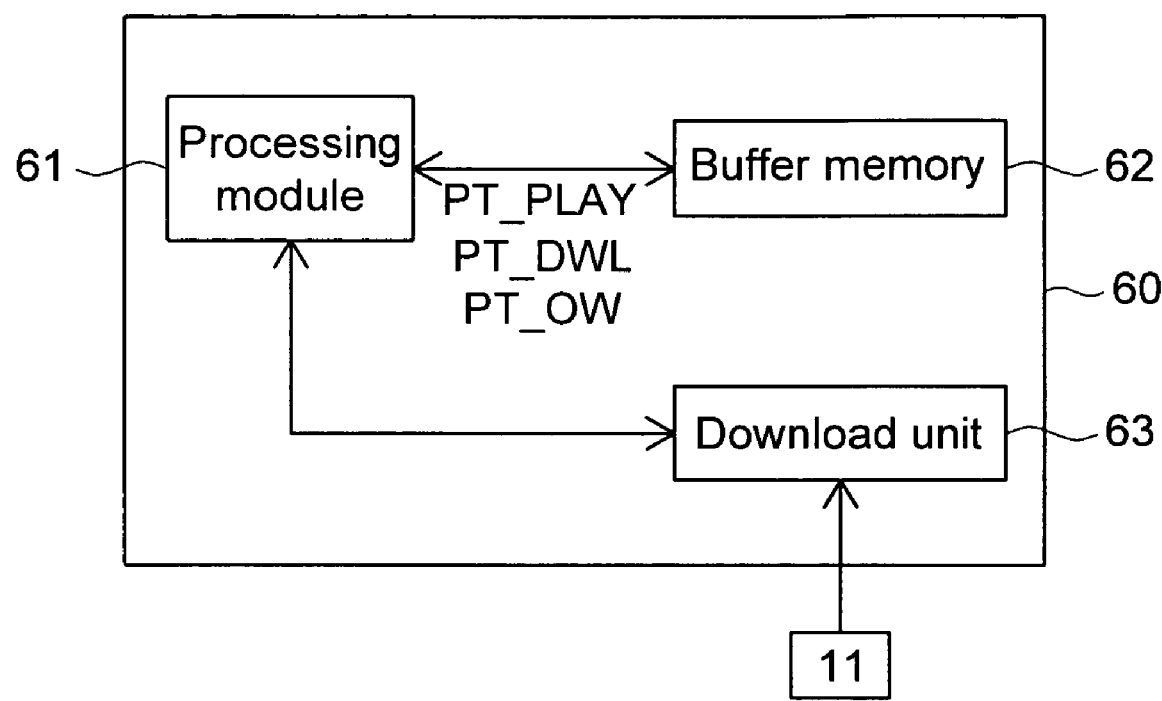
FIG. 6 is a schematic illustration showing an electronic device according to the embodiment of the invention.

In addition, if the user actively pauses playing, the downloading of the multimedia streaming data 11 may also be paused. FIG. 6 is a schematic illustration showing an electronic device 60 according to the embodiment of the invention, wherein the electronic device 60 can perform the method for playing the streaming data according to the embodiment of the invention. As shown in FIG. 6, the electronic device 60 includes a processing module 61, a buffer memory 62 and a download unit 63. Of course, the electronic device 60 may also include other module/circuits based on the function of the electronic device 60. For the sake of simplicity, other module/circuits will not be depicted.

The processing module 61 is a general-purpose microprocessor, for example. The buffer memory 62 is a memory of the electronic device or a part of the memory. The download unit 63 downloads a file (e.g., a multimedia streaming file 11) from the outside (e.g., the network server) to the electronic device 60 under the control of the processing module 61.

The processing module 61 determines the capacity of the buffer memory 62 based on the available memory resource of the electronic device 60 and/or the current memory usage status.

The processing module 61 generates and outputs indicators PT_DWL, PT_PLAY and PT_OW to the buffer memory 62 based on the usage status of the buffer memory 62 and/or the data downloaded by the download unit 63. For example, when the buffer memory 62 has been fully filled, the processing module 61 generates the overwriting indicator PT_OW based on the download speed of the download unit 63 and the play indicator PT_PLAY. In addition, the processing module 61 has to prevent the download indicator PT_DWL from exceeding the overwriting indicator PT_OW to prevent the error overwriting condition from happening when the buffer memory 62 is in the fully filled status.

The processing module 61 pauses the operation of the buffer memory 62 and makes the download unit 63 pause downloading the file from the outside in response to a pause command.

If the processing module 61 judges that the part to be played by the user has been stored in the buffer memory 62, the electronic device 60 plays the sought to-be-played part under the control of the processing module 61 in response to a forward seeking command.

On the other hand, if the processing module 61 judges that the part to be played by the user is not stored in the buffer memory 62, the download unit 63 downloads the sought to-be-played part to the buffer memory 62 under the control of the processing module 61 in response to the forward seeking command. Then, the electronic device 60 plays the part.

If the processing module 61 judges that the part to be played by the user has not yet been overwritten (i.e., the part is still stored in the buffer memory 62), the electronic device

60 can play the sought to-be-played part under the control of the processing module 61 in response to a backward seeking command.

If the processing module 61 judges that the part to be played by the user has been overwritten (i.e., the part is not stored in the buffer memory 62), the download unit 63 downloads the sought to-be-played part to the buffer memory 62 under the control of the processing module 61 in response to the backward seeking command. Then, the electronic device 60 plays the part.

The electronic device 60 may be one of a mobile telephone having the wired/wireless connection function and the multimedia playing function, a personal digital assistant (PDA) having the wired/wireless connection function and the multimedia playing function, a multimedia playing device having the wired/wireless connection function and the multimedia playing function, and a handheld electronic device having the wired/wireless connection function and the multimedia playing function. The multimedia playing device may be a MP3 player or a MP4 player. The wireless connection function may be the function of connecting to the network server to download the file through the third generation (3G) mobile telephone or the wireless local area network (WLAN).

In addition, this embodiment is suitable for the electronic device having the embedded system and the fixed memory capacity.

A computer readable information storage media is additionally disclosed according to the embodiment of the invention. A program is stored on the media and may be used to perform the method for playing the multimedia streaming data according to the embodiment of the invention. The computer readable information storage media of this embodiment includes, for example but without limitation to, an optical information storage media or a magnetic information storage media. The optical information storage media may be CD, DVD, HD-DVD, blue-ray DVD or the like. The magnetic information storage media may be a floppy disk drive, a hard disk drive, a magnetic tape drive, a magnetic optical drive or the like. In addition, the computer readable information storage media also includes a program code that can be transferred through the network/transmission media (e.g., air).

In summary, the ring buffer and the progressively download technique are adopted. When the multimedia streaming data is being played, the embodiment of the invention still can completely play the multimedia streaming data even if the capacity of the ring buffer is smaller than the size of the multimedia streaming data. Consequently, even the client having the limited memory resource still can play the multimedia streaming data with the large file size. In addition, the use of the embodiment of the invention can effectively save the required memory space. Furthermore, the good multimedia playing effect can be achieved without the need of the high capacity memory in the electronic device according to the embodiment of the invention. So, the cost can be advantageously and greatly saved.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for playing streaming data, the method being suitable for an electronic device having a buffer memory, the method comprising:

downloading a part of a streaming file to the buffer memory for playing, wherein a size of the streaming file is larger than a capacity of the buffer memory;

downloading another part of the streaming file to the buffer memory; and overwriting a played part of the streaming file stored in the buffer memory based on a usage status of the buffer memory;

wherein the usage status comprises an allowable overwriting position of the buffer memory, a download speed of the streaming file and a data reading position of the buffer memory.

2. The method according to claim 1, wherein when the usage status of the buffer memory indicates an overwritten event, the allowable overwriting position of the buffer memory is determined and the played part of the streaming file stored in the buffer memory is overwritten based on the download speed of the streaming file and the data reading position of the buffer memory.

3. The method according to claim 1, further comprising:

playing a sought to-be-played part of the streaming file if the sought to-be-played part of the streaming file has been stored in the buffer memory during forward seeking.

4. The method according to claim 1, further comprising:

downloading a sought to-be-played part of the streaming file if the sought to-be-played part of the streaming file has not yet been stored in the buffer memory during forward seeking.

5. The method according to claim 1, further comprising:

playing a sought to-be-played part of the streaming file if the sought to-be-played part of the streaming file has not yet been overwritten during backward seeking.

6. The method according to claim 1, further comprising:

downloading a sought to-be-played part of the streaming file if the sought to-be-played part of the streaming file has been overwritten during backward seeking.

7. A method for playing streaming data, the method being suitable for an electronic device having a buffer memory, the method comprising:

progressively downloading a streaming file to the buffer memory, wherein a size of the streaming file is larger than a capacity of the buffer memory;

playing and temporarily storing the streaming file stored the buffer memory; and determining whether or not to overwrite a part of the streaming file stored in the buffer memory based on a data writing position of the buffer memory wherein the overwriting is performed according to an allowable overwriting position of the buffer memory, a download speed of the streaming file and a data reading position of the buffer memory.

8. The method according to claim 7, wherein when the data writing position indicates that the buffer memory has been fully filled, the allowable overwriting position of the buffer memory is determined and the streaming file stored in the buffer memory is thus overwritten based on the download speed of the streaming file and the data reading position of the buffer memory.

9. The method according to claim 7, further comprising:

playing a sought to-be-played part of the streaming file if the sought to-be-played part of the streaming file has been stored in the buffer memory during forward seeking.

10. The method according to claim 7, further comprising:
downloading a sought to-be-played part of the streaming file if the sought to-be-played part of the streaming file has not yet been stored in the buffer memory during forward seeking.

11. The method according to claim 7, further comprising:
playing a sought to-be-played part of the streaming file if the sought to-be-played part of the streaming file has not yet been overwritten during backward seeking.

12. The method according to claim 7, further comprising:
downloading a sought to-be-played part of the streaming file if the sought to-be-played part of the streaming file has been overwritten during backward seeking.

13. An electronic device, comprising:
a buffer memory;
a download unit; and
a processing module, coupled to the buffer memory and the download unit, for controlling operations of the buffer memory and the download unit, wherein:
the download unit downloads a part of a streaming file to the buffer memory for playing, and a size of the streaming file is larger than a capacity of the buffer memory;
the download unit downloads another part of the streaming file to the buffer memory; and
when the buffer memory has been fully filled, the processing module overwrites a played part of the streaming file stored in the buffer memory,
wherein the overwriting is performed according to an allowable overwriting position of the buffer memory, a download speed of the streaming file and a data reading position of the buffer memory.

14. The electronic device according to claim 13, wherein when the buffer memory has been fully filled, the processing module determines the allowable overwriting position of the buffer memory and thus overwrites the streaming file stored in the buffer memory based on the download speed of the streaming file and the data reading position of the buffer memory.

15. The electronic device according to claim 13, wherein if a sought to-be-played part of the streaming file has been stored in the buffer memory during forward seeking, the sought to-be-played part of the streaming file is played under control of the processing module.

16. The electronic device according to claim 13, wherein if a sought to-be-played part of the streaming file has not yet been stored in the buffer memory during forward seeking, the sought to-be-played part of the streaming file is downloaded to the buffer memory under control of the processing module.

17. The electronic device according to claim 13, wherein if a sought to-be-played part of the streaming file has not yet been overwritten during backward seeking, the sought to-be-played part of the streaming file is played under control of the processing module.

18. The electronic device according to claim 13, wherein if a sought to-be-played part of the streaming file has been overwritten during backward seeking, the sought to-be-played part of the streaming file is downloaded to the buffer memory under control of the processing module.

19. An electronic device, comprising:
a buffer memory;
a download unit; and
a processing module, coupled to the buffer memory and the download unit, for controlling operations of the buffer memory and the download unit, wherein:
the download unit progressively downloads a streaming file to the buffer memory, and a size of the streaming file is larger than a capacity of the buffer memory;
the processing module plays and temporarily stores the streaming file stored in the buffer memory; and
the processing module determines whether or not to overwrite a part of the streaming file stored in the buffer memory based on a data writing position of the buffer memory;
wherein the overwriting is performed according to an allowable overwriting position of the buffer memory, a download speed of the streaming file and a data reading position of the buffer memory.

20. The electronic device according to claim 19, wherein when the buffer memory has been fully filled, the processing module determines the allowable overwriting position of the buffer memory and thus overwrites the streaming file stored in the buffer memory based on the download speed of the streaming file and the data reading position of the buffer memory.

21. The electronic device according to claim 19, wherein if a sought to-be-played part of the streaming file has been stored in the buffer memory during forward seeking, the sought to-be-played part of the streaming file is played under control of the processing module.

22. The electronic device according to claim 19, wherein if a sought to-be-played part of the streaming file has not yet been stored in the buffer memory during forward seeking, the sought to-be-played part of the streaming file is downloaded to the buffer memory under control of the processing module.

23. The electronic device according to claim 19, wherein if a sought to-be-played part of the streaming file has not yet been overwritten during backward seeking, the sought to-be-played part of the streaming file is played under control of the processing module.

24. The electronic device according to claim 19, wherein if a sought to-be-played part of the streaming file has been overwritten during backward seeking, the sought to-be-played part of the streaming file is downloaded to the buffer memory under control of the processing module.

25. A non-transitory computer readable information storage device, on which a program is stored, the program being used to perform a method for playing streaming data, the method for playing the streaming data being suitable for an electronic device having a buffer memory, the method comprising:
downloading a part of a streaming file to the buffer memory for playing, wherein a size of the streaming file is larger than a capacity of the buffer memory;
downloading another part of the streaming file to the buffer memory; and
overwriting a played part of the streaming file stored in the buffer memory when the buffer memory has been fully filled;
wherein the overwriting is performed according to an allowable overwriting position of the buffer memory, a download speed of the streaming file and a data reading position of the buffer memory.

26. The information storage device according to claim 25, wherein in the method, when the buffer memory has been fully filled, the allowable overwriting position of the buffer memory is determined and the streaming file stored in the buffer memory is thus overwritten based on the download speed of the streaming file and the data reading position of the buffer memory.

27. The information storage device according to claim 25, wherein the method further comprises:

playing a sought to-be-played part of the streaming file if the sought to-be-played part of the streaming file has been stored in the buffer memory during forward seeking.

28. The information storage device according to claim 25, wherein the method further comprises:

downloading a sought to-be-played part of the streaming file if the sought to-be-played part of the streaming file has not yet been stored in the buffer memory during forward seeking.

29. The information storage device according to claim 25, wherein the method further comprises:

playing a sought to-be-played part of the streaming file if the sought to-be-played part of the streaming file has not yet been overwritten during backward seeking.

30. The information storage device according to claim 25, wherein the method further comprises:

downloading a sought to-be-played part of the streaming file if the sought to-be-played part of the streaming file has been overwritten during backward seeking.

31. A non-transitory computer readable information storage device, on which a program is stored, the program being used to perform a method for playing streaming data, the method for playing the streaming data being suitable for an electronic device having a buffer memory, the method comprising:

progressively downloading a streaming file to the buffer memory, wherein a size of the streaming file is larger than a capacity of the buffer memory;

playing and temporarily storing the streaming file stored in the buffer memory; and determining whether or not to overwrite a part of the streaming file stored in the buffer memory based on a data writing position of the buffer memory wherein the overwriting is performed according to an allowable overwriting position of the buffer memory, a download speed of the streaming file and a data reading position of the buffer memory.

32. The information storage device according to claim 31, wherein in the method for playing the streaming data, when the buffer memory has been fully filled, the allowable overwriting position of the buffer memory is determined and the streaming file stored in the buffer memory is overwritten based on the download speed of the streaming file and the data reading position of the buffer memory.

33. The information storage device according to claim 31, wherein the method for playing the streaming data further comprises:

playing a sought to-be-played part of the streaming file if the sought to-be-played part of the streaming file has been stored in the buffer memory during forward seeking.

34. The information storage device according to claim 31, wherein the method for playing the streaming data further comprises:

downloading a sought to-be-played part of the streaming file if the sought to-be-played part of the streaming file has not yet been stored in the buffer memory during forward seeking.

35. The information storage device according to claim 31, wherein the method for playing the streaming data further comprises:

playing a sought to-be-played part of the streaming file if the sought to-be-played part of the streaming file has not yet been overwritten during backward seeking.

36. The information storage device according to claim 31, wherein the method for playing the streaming data further comprises:

downloading a sought to-be-played part of the streaming file if the sought to-be-played part of the streaming file has been overwritten during backward seeking.

* * * * *